US008672539B2

(12) United States Patent
Skinner

(10) Patent No.: US 8,672,539 B2
(45) Date of Patent: Mar. 18, 2014

(54) MULTIPLE SENSOR FIBER OPTIC SENSING SYSTEM

(75) Inventor: Neal G. Skinner, Lewisville, TX (US)

(73) Assignee: Halliburton Energy Services, Inc., Houston, TX (US)

(*) Notice: Subject to any disclaimer, the term of this patent is extended or adjusted under 35 U.S.C. 154(b) by 880 days.

(21) Appl. No.: 12/480,336

(22) Filed: Jun. 8, 2009

(65) Prior Publication Data
US 2009/0310642 A1 Dec. 17, 2009

(30) Foreign Application Priority Data

Jun. 12, 2008 (WO) .............. PCT/US2008/066758

(51) Int. Cl.
*G01V 8/02* (2006.01)
*G01J 5/54* (2006.01)
(52) U.S. Cl.
USPC ........... 374/130; 374/141; 374/143; 374/161; 374/1; 702/6; 73/152.46
(58) Field of Classification Search
USPC ......... 374/120, 131, 137, 166, 141, 142, 143, 374/45, 29, 135, 147, 167, 208, 110, 112, 374/115, 161, 1; 73/152.46, 152.51, 73/152.54; 702/6, 12, 13; 250/253, 256
See application file for complete search history.

(56) References Cited

U.S. PATENT DOCUMENTS

| 5,222,166 A * | 6/1993 | Weltha ............................ 385/24 |
|---|---|---|
| 5,925,879 A | 7/1999 | Hay |
| 5,973,317 A | 10/1999 | Hay |
| 6,009,216 A | 12/1999 | Pruett et al. |
| 6,278,811 B1 | 8/2001 | Hay et al. |
| 6,285,446 B1 | 9/2001 | Farhadiroushan |
| 6,380,534 B1 | 4/2002 | Farhadiroushan et al. |
| 6,422,084 B1 | 7/2002 | Fernald et al. |
| 6,531,694 B2 | 3/2003 | Tubel et al. |
| 6,532,839 B1 * | 3/2003 | Kluth et al. .................. 73/866.5 |

(Continued)

FOREIGN PATENT DOCUMENTS

| EP | 1181501 B1 | 8/2004 |
| JP | 6281506 A | 10/1994 |
| WO | 0037976 A2 | 6/2000 |

OTHER PUBLICATIONS

International Preliminary Report on Patentability with Written Opinion issued Dec. 23, 2010, for International Patent Application No. PCT/US08/066758, 6 pages.

(Continued)

*Primary Examiner* — Gail Verbitsky
(74) *Attorney, Agent, or Firm* — Smith IP Services, P.C.

(57) ABSTRACT

A multiple sensor fiber optic sensing system. A method of sensing distributed temperature and at least another property in a well includes the steps of: interconnecting an optical switch to an optical fiber which extends along a wellbore in the well; operating the optical switch to optically connect the optical fiber to an interferometric measurement system; and operating the optical switch to optically connect the optical fiber to a distributed temperature measurement system. Another method includes the steps of: installing an optical fiber along a wellbore in the well, the optical fiber being a first distributed temperature sensor, the installing step including providing a substantial length of the optical fiber proximate a second sensor which senses the well property; and calibrating the second sensor using a temperature sensed by the first sensor in the substantial length of the optical fiber.

20 Claims, 3 Drawing Sheets

(56) References Cited

U.S. PATENT DOCUMENTS

| | | | |
|---|---|---|---|
| 6,630,658 B1 | 10/2003 | Bohnert et al. | |
| 6,668,656 B2 | 12/2003 | Fernald et al. | |
| 6,674,928 B2 | 1/2004 | Johnson et al. | |
| 6,728,165 B1 * | 4/2004 | Roscigno et al. | 367/14 |
| 6,751,556 B2 * | 6/2004 | Schroeder et al. | 702/6 |
| 6,807,324 B2 | 10/2004 | Pruett | |
| 6,901,101 B2 | 5/2005 | Frick | |
| 6,928,202 B2 | 8/2005 | Pickrell et al. | |
| 6,933,491 B2 | 8/2005 | Maida, Jr. | |
| 6,957,576 B2 | 10/2005 | Skinner et al. | |
| 7,036,379 B2 | 5/2006 | Bailey et al. | |
| 7,215,416 B2 * | 5/2007 | Yamate et al. | 356/73.1 |
| 7,223,962 B2 | 5/2007 | Fageraas et al. | |
| 7,252,437 B2 | 8/2007 | Ringgenberg | |
| 7,266,261 B2 | 9/2007 | Arias Vidal et al. | |
| 7,282,698 B2 | 10/2007 | Childers | |
| 7,292,345 B2 | 11/2007 | Hadley et al. | |
| 7,342,217 B2 | 3/2008 | Vidal et al. | |
| 7,412,117 B2 * | 8/2008 | Chen et al. | 385/12 |
| 7,430,903 B2 * | 10/2008 | Ramos | 73/204.11 |
| 7,574,075 B2 * | 8/2009 | Xia | 385/12 |
| 7,668,411 B2 * | 2/2010 | Davies et al. | 385/12 |
| 7,773,841 B2 * | 8/2010 | Varadarajan et al. | 385/32 |
| 2006/0146337 A1 * | 7/2006 | Hartog | 356/478 |
| 2006/0214098 A1 * | 9/2006 | Ramos | 250/256 |
| 2011/0090496 A1 * | 4/2011 | Samson et al. | 356/301 |
| 2011/0139447 A1 * | 6/2011 | Ramos et al. | 166/254.2 |
| 2011/0174497 A1 * | 7/2011 | Den Boer et al. | 166/369 |
| 2011/0229071 A1 * | 9/2011 | Vincelette et al. | 385/13 |
| 2011/0290992 A1 * | 12/2011 | Sato et al. | 250/253 |
| 2011/0292965 A1 * | 12/2011 | Mihailov | 374/121 |
| 2012/0019903 A1 * | 1/2012 | Nakagawa | 359/344 |

OTHER PUBLICATIONS

International Search Report and Written Opinion issued Sep. 8, 2008, for International Patent Application Serial No. PCT/US08/66758, 7 pages.

English Translation of Abstract for Japanese patent 6281506, publication date Oct. 7, 1994, 1 page.

* cited by examiner

MULTIPLE SENSOR FIBER OPTIC SENSING SYSTEM

CROSS-REFERENCE TO RELATED APPLICATION

The present application claims the benefit under 35 USC §119 of the filing date of International Application No. PCT/US08/66758, filed Jun. 12, 2008. The entire disclosure of this prior application is incorporated herein by this reference.

BACKGROUND

The present disclosure relates generally to equipment utilized and operations performed in conjunction with a subterranean well and, in an embodiment described herein, more particularly provides a multiple sensor fiber optic sensing system.

In the limited confines and hazardous environment of a subterranean well, it is desirable for well tools and other equipment to be durable, reliable and resistant to damage. However, in recent years the use of optical fibers in wells has increased, and it is well known that optical fibers are relatively delicate and easily damaged. Nonetheless, use of optical fibers for various purposes (such as transmission of command and control signals, use in sensing systems, etc.) continues to grow.

Of course, the greater the number of optical fibers in a well, the greater the chance that at least one of the optical fibers will become damaged or otherwise inoperable. In addition, only a limited number of optical fibers can be accommodated by the equipment installed in most wells.

Therefore, it will be appreciated that improvements are needed in the art of utilizing optical fibers in subterranean well systems. This disclosure provides such improvements.

SUMMARY

In carrying out the principles of the present disclosure, a fiber optic sensing system and associated method are provided which solve at least one problem in the art. One example is described below in which a same optical fiber is used in sensing multiple properties in a well. Another example is described below in which the optical fiber senses distributed temperature and also provides a temperature reference for calibrating another sensor.

In one aspect, a method of sensing distributed temperature and at least another property in a subterranean well is provided by this disclosure. The method includes the steps of: interconnecting an optical switch to an optical fiber which extends along a wellbore in the well; operating the optical switch to optically connect the optical fiber to an interferometric measurement system; and operating the optical switch to optically connect the optical fiber to a distributed temperature measurement system.

In another aspect, a method is provided which includes the steps of: installing an optical fiber along a wellbore in the well, the optical fiber being a first distributed temperature sensor, the installing step including providing a substantial length of the optical fiber proximate a second sensor which senses the well property; and calibrating the second sensor using a temperature sensed by the first sensor in the substantial length of the optical fiber.

In yet another aspect, a fiber optic sensing system for sensing distributed temperature and at least another property in a subterranean well is provided. The system includes an optical fiber extending along a wellbore, the optical fiber being a first sensor which senses distributed temperature along the wellbore; a second sensor for sensing the property; an optical switch optically connected to the optical fiber; a distributed temperature measurement system optically connectable to the optical fiber via the optical switch; and another optical measurement system optically connectable to the second sensor via the optical switch and the optical fiber to measure the property.

By using a same optical fiber to both sense distributed temperature and transmit indications of another property from another sensor, the number of optical fibers installed in a well can be reduced, or at least the usefulness of the installed optical fibers can be enhanced. These principles can be used to advantage whether the optical fiber is permanently or temporarily installed in the well.

These and other features, advantages, benefits and objects will become apparent to one of ordinary skill in the art upon careful consideration of the detailed description of representative embodiments of the disclosure hereinbelow and the accompanying drawings, in which similar elements are indicated in the various figures using the same reference numbers.

DETAILED DESCRIPTION

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
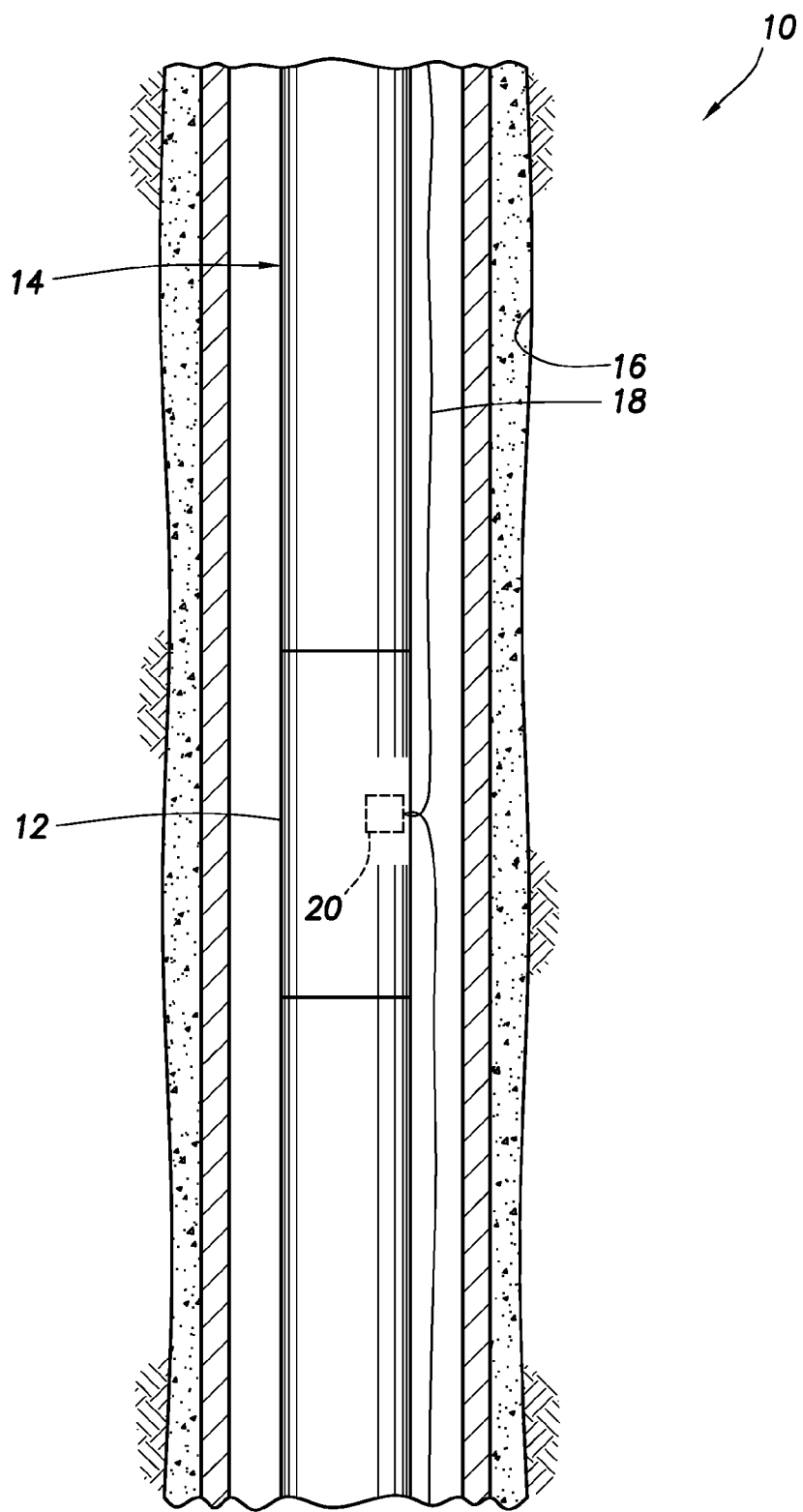
FIG. 1 is a schematic partially cross-sectional view of a well system embodying principles of the present disclosure.

Representatively illustrated in FIG. 1 is a well system 10 which embodies principles of the present disclosure. In the well system 10, a well tool 12 has been interconnected as part of a tubular string 14, which has been installed in a wellbore 16.

An optical fiber 18 is installed along with the tubular string 14. The optical fiber 18 is used as a distributed temperature sensor, and is connected to a sensor 20 of the well tool 12. Preferably, the optical fiber 18 is a multimode type of optical fiber, although single mode fiber may be used if desired. In one unique feature of the well system 10, the same optical fiber 18 is used for distributed temperature sensing, as well as measuring another property sensed by the sensor 20.

It should be clearly understood that the well system 10 is only described here as one example of a wide variety of different well systems in which the principles of this disclosure may be utilized. For example, the optical fiber 18 could be contained in a conduit (such as a control line), in a cable, within an interior flow passage of the tubular string 14, in a sidewall of the tubular string, or in any other location. The optical fiber 18 could be installed prior to, during or after installation of the tubular string 14. The sensor 20 could similarly be in any location and could be installed at any time. Multiple sensors could be connected to the optical fiber 18. Multiple optical fibers could be connected to any number of sensors. Thus, it will be appreciated that the principles of this disclosure are not limited in any way to the details of the well system 10.

Figure 2:
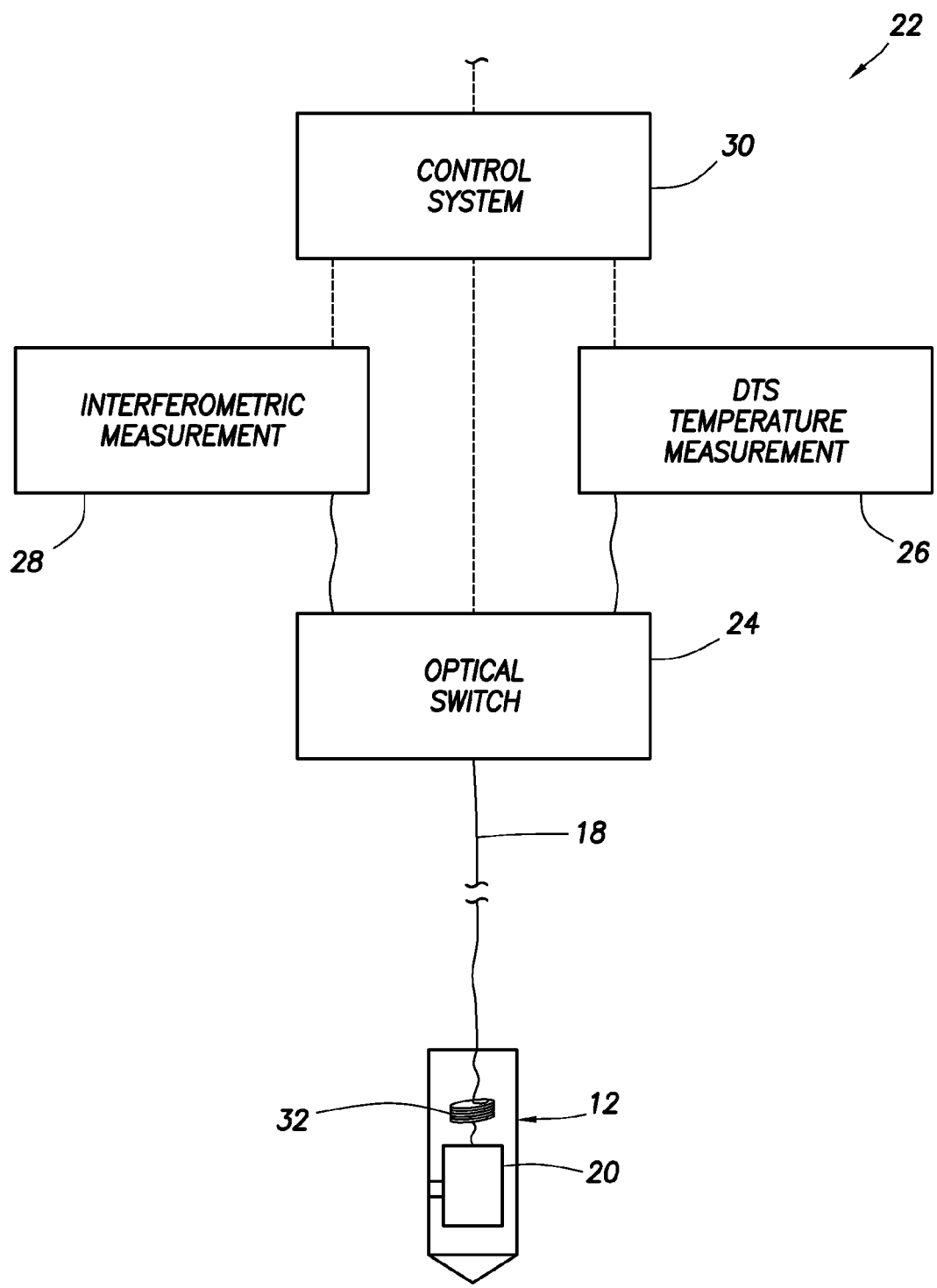
FIG. 2 is a schematic view of a fiber optic sensing system embodying principles of the present disclosure.

Referring additionally now to FIG. 2, a schematic diagram of a sensing system 22 which may be used in the well system 10 of FIG. 1 is representatively illustrated. In this example, the well tool 12 is configured for installation in the wellbore 16 via wireline, coiled tubing or another temporary installation method.

The optical fiber 18 extends from the well tool 12 to an optical switch 24. The optical switch 24 alternately connects the optical fiber 18 to a conventional distributed temperature sensing (DTS) temperature measurement system 26 (i.e., capable of detecting temperature along the length of the optical fiber, e.g., by analysis of Raman or other backscattering of light transmitted through the optical fiber), and to a conventional interferometric measurement system 28 (i.e., comprising an interferometer and capable of detecting indications of a property sensed by the sensor 20 corresponding to changes in an interference pattern).

A control system 30 is used to control operation of the optical switch 24. Note that in FIG. 3 optical lines are shown as continuous lines, whereas electrical lines (such as those connected between the control system 30 and each of the optical switch 24 and the measurement systems 26, 28) are shown as dashed lines. The control system 30 may also be connected to a local area or remote network, to another control system, to a data storage device, etc. In addition, any of these elements 24, 26, 28, 30 may be combined into any number of devices (including one).

In another unique feature of the sensing system 22, the optical fiber 18 can serve an additional purpose of providing a temperature reference for calibrating the sensor 20. Specifically, a substantial length 32 of the optical fiber 18 may be contained in the well tool 12, or at least proximate the sensor 20, so that the reference temperature at the sensor can be conveniently determined. Preferably, multiple wraps of the optical fiber 18 are coiled within the well tool 12.

Figure 3:
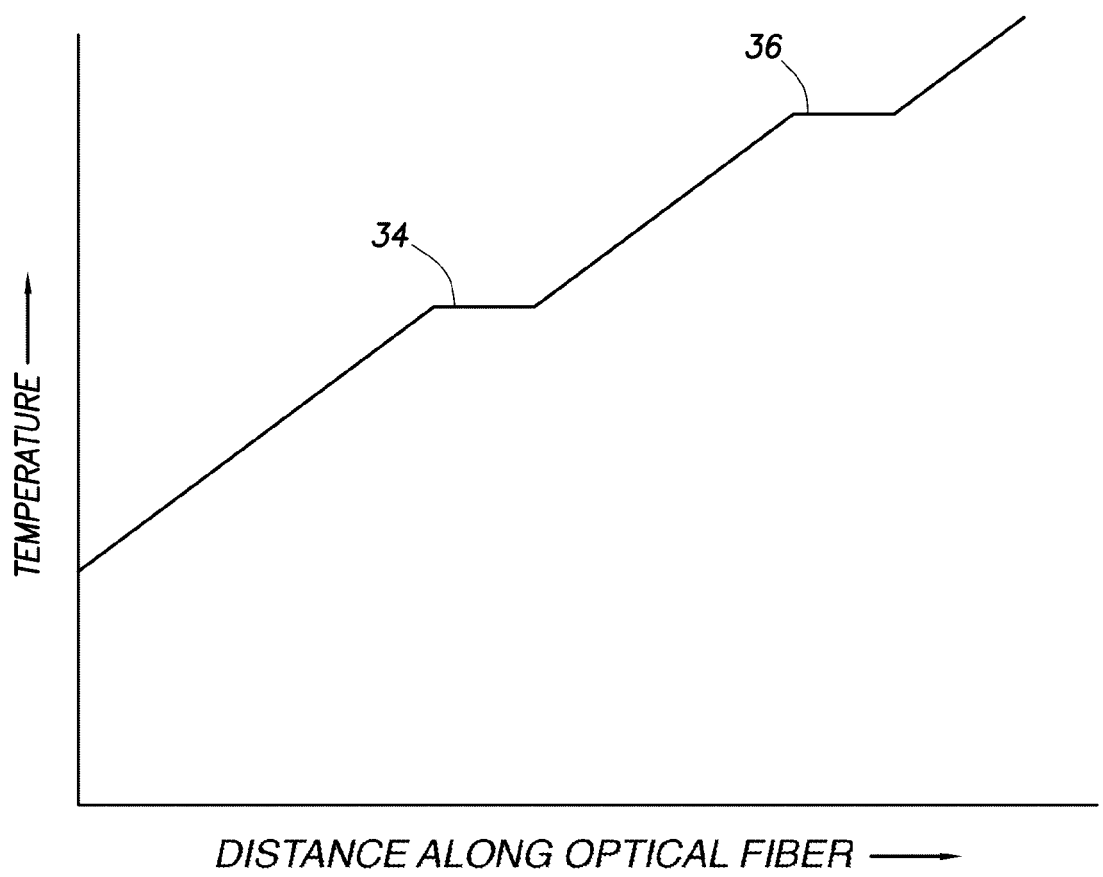
FIG. 3 is a graph depicting temperature distribution in the well system of FIG. 1 as measured by the sensing system of FIG. 2.

Referring additionally now to FIG. 3, the manner in which the reference temperature is determined can be readily seen. Since the entire substantial length 32 of the optical fiber 18 is positioned at a same location in the wellbore 16, the temperature along this length of the optical fiber will be the same.

As depicted in FIG. 3, the reference temperature appears as a constant temperature 34 on a graph of temperature versus distance along the optical fiber 18 in wellbore 16. Another constant temperature 36 indicated on the graph could be another substantial length of optical fiber alone or at a location of another sensor.

Otherwise, the graph as depicted in FIG. 3 shows a steadily increasing temperature with increased depth, corresponding to a geothermal gradient at the well. Alternatively, the graph could indicate temperature fluctuations due to fluid production, injection, cross-flow between zones, etc.

The reference temperature 34 is used to calibrate the output of the sensor 20, in the situation in which the sensor output varies with temperature. In this manner, a calibrated output of the sensor 20 can be obtained, without requiring a separate optical fiber for sensing temperature at the location of the sensor.

Note that the sensor 20 described above could comprise any type of sensor, or combination of sensors, capable of sensing a property in the well, and the property could be any of a wide variety of well properties, such as pressure (including differential pressure), force, position, resistivity, water cut, fluid composition, flow rate, etc. For example, the sensor 20 could be an interferometric pressure sensor. The well tool 12 could be any type of well tool, such as a flow control device (valve, choke, etc.), packer, sand control screen, sensor assembly, etc.

It may now be fully appreciated that the above disclosure provides a number of advancements to the art. For example, by using a same optical fiber 18 to both sense distributed temperature and transmit indications of another property from another sensor 20, the number of optical fibers installed in a well can be reduced, or at least the usefulness of the installed optical fibers can be enhanced. These principles can be used to advantage whether the optical fiber 18 is permanently or temporarily installed in the well.

In particular, the above disclosure provides a method of sensing distributed temperature and at least another property in a subterranean well. The method includes the steps of: interconnecting an optical switch 24 to an optical fiber 18 which extends along a wellbore 16 in the well; operating the optical switch 24 to optically connect the optical fiber 18 to an interferometric measurement system 28; and operating the optical switch 24 to optically connect the optical fiber 18 to a distributed temperature measurement system 26.

The method may include the step of controlling the optical switch 24 by use of a control system 30 connected to the optical switch. The method may also include connecting the control system 30 to outputs of each of the interferometric and distributed temperature measurement systems 26, 28.

The method may include the step of providing a substantial length 32 of the optical fiber 18 proximate a sensor 20 in the well which senses the property. The property may be pressure, and the sensor 20 may include an interferometric pressure sensor.

The method may include the step of permanently installing the optical fiber 18 in the well adjacent a tubular string 14. The method may include temporarily installing the optical fiber 18 in the well.

The above disclosure also provides a method which includes the steps of: installing an optical fiber 18 along a wellbore 16 in the well, the optical fiber being a first distributed temperature sensor, the installing step including providing a substantial length 32 of the optical fiber 18 proximate a second sensor 20 which senses the well property; and calibrating the second sensor 20 using a temperature sensed by the first sensor in the substantial length 32 of the optical fiber 18.

The installing step may include containing the second sensor 20 and the substantial length 32 of the optical fiber 18 in a well tool 12, and installing the well tool in the well. The installing step may include coiling multiple wraps of the substantial length 32 of the optical fiber 18 within a well tool 12.

Also provided by the above disclosure is a fiber optic sensing system 22 for sensing distributed temperature and at least another property in a subterranean well. The system 22 includes: an optical fiber 18 extending along a wellbore 16, the optical fiber being a first sensor which senses distributed temperature along the wellbore; a second sensor 20 for sensing the property; an optical switch 24 optically connected to the optical fiber 18; a first distributed temperature measurement system 26 optically connectable to the optical fiber 18 via the optical switch 24; and a second optical measurement system 28 optically connectable to the second sensor 20 via the optical switch 24 and the optical fiber 18 to measure the property.

The sensing system 22 may also include a control system 30 which selectively operates the optical switch 24. The optical switch 24 may alternately connect the optical fiber 18 to the first and second measurement systems 26, 28 in response to control signals from the control system 30.

The sensing system 22 may include a substantial length 32 of the optical fiber 18 positioned proximate the second sensor 20 for temperature calibrating the second sensor.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of sensing a first distributed property and at least a second property in a subterranean well, the method comprising the steps of:
    interconnecting an optical switch to an optical fiber which extends along a wellbore in the well;
    operating the optical switch to optically connect the optical fiber to an interferometric measurement system; and
    operating the optical switch to optically connect the optical fiber to a distributed measurement system which measures backscattering of light indicative of the first property distributed along the optical fiber.

2. The method of claim 1, further comprising the step of controlling the optical switch by use of a control system connected to the optical switch.

3. The method of claim 2, further comprising the step of connecting the control system to outputs of each of the interferometric and distributed measurement systems.

4. The method of claim 1, further comprising the step of providing a substantial length of the optical fiber proximate a sensor in the well which senses the second property.

5. The method of claim 4, wherein
    the second property is pressure, and wherein the sensor comprises an interferometric pressure sensor.

6. The method of claim 1, further comprising the step of permanently installing the optical fiber in the well adjacent a tubular string.

7. The method of claim 1, further comprising the step of temporarily installing the optical fiber in the well.

8. A method of sensing a distributed first property and at least a second property in a subterranean well, the method comprising the steps of:
    installing an optical fiber along a wellbore in the well, the optical fiber being a first distributed sensor of a distributed measurement system which measures backscattering of light indicative of the first property distributed along the optical fiber, the installing step including providing a substantial length of the optical fiber proximate a second sensor which senses the second property; and
    calibrating the second sensor using the first property sensed by the first sensor in the substantial length of the optical fiber.

9. The method of claim 8, wherein the installing step further comprises containing the second sensor and the substantial length of the optical fiber in a well tool, and installing the well tool in the well.

10. The method of claim 8, wherein the installing step further comprises coiling multiple wraps of the substantial length of the optical fiber within a well tool.

11. The method of claim 8, further comprising the steps of interconnecting an optical switch to the optical fiber, operating the optical switch to optically connect the optical fiber to an interferometric measurement system; and operating the optical switch to optically connect the optical fiber to the distributed measurement system.

12. The method of claim 11, further comprising the step of controlling the optical switch by use of a control system connected to the optical switch.

13. The method of claim 12, further comprising the step of connecting the control system to outputs of each of the interferometric and distributed measurement systems.

14. The method of claim 8, wherein the second property is pressure, and wherein the second sensor comprises an interferometric pressure sensor.

15. The method of claim 8, wherein the installing step further comprises permanently installing the optical fiber in the well adjacent a tubular string.

16. The method of claim 8, wherein the installing step further comprises temporarily installing the optical fiber in the well.

17. A fiber optic sensing system for sensing a distributed first property and at least a second property in a subterranean well, the system comprising:
    an optical fiber extending along a wellbore, the optical fiber being a first sensor which senses the distributed first property along the wellbore;
    a second sensor optically connected to the optical fiber;
    an optical switch optically connected to the optical fiber;
    a first optical measurement system which measures backscattering of light indicative of the first property distributed along the optical fiber; and
    a second optical measurement system which measures the second property via the second sensor, wherein the optical switch alternately optically connects the optical fiber to the first and second measurement systems.

18. The sensing system of claim 17, further comprising a control system which selectively operates the optical switch.

19. The sensing system of claim 18, wherein the optical switch alternately connects the optical fiber to the first and second measurement systems in response to control signals from the control system.

20. The sensing system of claim 17, further comprising a substantial length of the optical fiber positioned proximate the second sensor for calibrating the second sensor.

\* \* \* \* \*